United States Patent [19]
Wright

[11] 4,003,091
[45] Jan. 11, 1977

[54] TRANSDUCER SUPPORT AND STABILIZER

[75] Inventor: Gary Thorup Wright, Longmont, Colo.

[73] Assignee: International Business Machines Corporation, Armonk, N.Y.

[22] Filed: Mar. 8, 1976

[21] Appl. No.: 665,153

[52] U.S. Cl. .............................. 360/102; 360/86; 360/99

[51] Int. Cl.² ................ G11B 15/64; G11B 5/60; G11B 5/82

[58] Field of Search .......... 360/102, 103, 129, 122, 360/86, 97–99, 130, 135; 346/137

[56] References Cited
UNITED STATES PATENTS

| | | | |
|---|---|---|---|
| 2,921,144 | 1/1960 | Martin | 360/102 |
| 3,129,297 | 4/1964 | Schlichting | 360/103 |
| 3,489,381 | 1/1970 | Jones et al. | 360/103 |
| 3,940,794 | 2/1976 | Griffiths | 360/98 |

Primary Examiner—Alfred H. Eddleman
Attorney, Agent, or Firm—Herbert F. Somermeyer

[57] ABSTRACT

A toroidal-shaped stabilizer mounts a transducer for controlled penetration into a flexible record media, preferably a record disk. The toroidal-shaped stabilizer has a convex surface facing the flexible disk to be stabilized. The convex surface has an apex in an outer radial portion of the toroidal stabilizer. The toroidal stabilizer can be used in either a multiple disk assembly, with a single disk assembly or any nondisk type flexible magnetic record apparatus.

12 Claims, 8 Drawing Figures

PRIOR STABILIZER

TRANSDUCER SUPPORT AND STABILIZER

DOCUMENTS INCORPORATED BY REFERENCE

Commonly assigned, copending application Griffiths et al, Ser. No. 480,990, now U.S. Pat. No. 3,940,794, shows storage apparatus with which the present invention may be advantageously employed.

U.S. Pat. No. 3,688,285, G. Lawrence et al, shows a single disk record storage apparatus with which the present invention may also be advantageously employed.

BACKGROUND OF THE INVENTION

The present invention relates to transducer mounts and particularly those transducer mounts which provide flexible medium stabilization for enhancing transducing operations.

For successful magnetic recording, particularly at high densities, such as employed in storage apparatus for use with digital computers and data communication links, there should be a predictable constant spacing between a record medium and a transducer over a wide range of operating parameters. Since such spacing has a substantial effect on the fringing flux pattern and, hence, the resolution of the sensing and recording on the record medium, the predictable constant spacing is a key element in a successful magnetic recorder. Unfortunately, in flexible media storage apparatus, the interaction of many parameters has a substantial effect on the predictability and maintainability of such desired constant spacing. The parameters affecting such spacing include the stabilizer contour, penetration of the stabilizer into the record medium, the relative speed between the transducer and the record medium; in a disk recorder, the radial position of the transducer; the medium parameters, such as flexibility, thickness, etc.; the orientation or angle of attack of the stabilizer and transducer with respect to the record medium; the size of the stabilizer/transducer assembly; plus environmental factors such as temperature and humidity.

For ensuring constant spacing between the medium and the transducer, it is preferred that the stabilizer and transducer penetrate or "dimple" into the flexible record medium. When the present invention is being practiced in the apparatus shown in Griffiths et al, supra, stabilizer penetration into the plane of a disk can push the flexible disks together. Resulting contact results in some small radially directed rubbing. Such rubbing, even though of limited extent, can cause wear between the backing disks resulting in debris and degradation of recording apparatus performance. Accordingly, it is desired that the penetration should be controlled, preferably limited, while maintaining the predictable constant spacing.

Another aspect of stabilizer penetration is the loss of stabilization in a single disk apparatus as shown in Lawrence et al, supra. At the outer radial portion of a single record disk, penetration has a greater tendency to reduce the stabilizing effect of the backing plate than at an inner radius. Therefore, the radial position of the transducer has a material effect on the medium-to-transducer spacing, particularly so in single disk apparatus.

Some apparatus have employed air pumps (vacuum, pressure or a combination thereof) to accurately control transducer to medium spacing. Such air pumps add expense to the construction and operating costs of storage apparatus. It is desirable if such costs can be eliminated by obviating their requirement.

SUMMARY OF THE INVENTION

It is an object of the invention to provide an improved, simplified, transducer support and stabilizer which tends to provide a more predictable constant spacing over a wider range of operating parameters than heretofore possible.

In accordance with the invention, a toroidal stabilizer rings a transducer with the stabilizer having a convex surface for facing the record medium. The convex surface has an apex closer to the outer portion of the stabilizer than the inner portion. Relative movement of the medium and stabilizer then induces negative pressure between the medium and the transducer. When the centerhole is substantially closed from ambient pressure, such negative pressure urges the medium to move toward the transducer resulting in a stabilized medium-to-transducer spacing.

It is preferred that any transducer supported in the stabilizer have an air bearing surface extending axially beyond the convex surface toward a record medium.

The foregoing and other objects, features, and advantages of the invention will become apparent from the following more particular description of the preferred embodiment thereof, as illustrated in the accompanying drawing.

THE DRAWING

DETAILED DESCRIPTION

Figure 1:
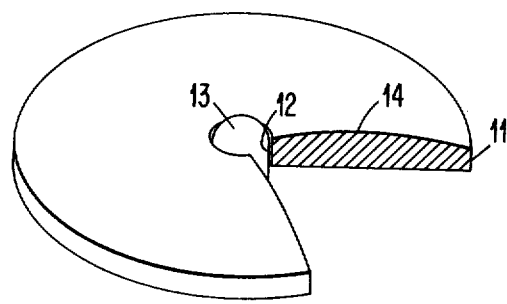
FIG. 1 is a perspective view of a stabilizer of the type contemplated by the invention.

Referring now more particularly to the drawing, like numerals indicate like parts and structural features in the various diagrams. The general configuration of the stabilizer is shown in FIG. 1. The stabilizer has a generally toroidal shape with an outer radial surface at 11 and an inner radial surface at 12. Surface 12 defines an aperture receiving transducer 13. Transducer 13 has a transducing portion extending outwardly in the same general direction as the convex surface of the stabilizer as at apex 14. The stabilizing surface contour of the stabilizer is intended to control the spacing between the record medium and transducer 13 at the center of the toroidal stabilizer. The contour of the surface 14 is a critical factor in achieving the objects of the present invention. According to one aspect of the invention, when transducer 13 has an air bearing surface extending beyond apex 14, such surface tends to push a record medium away. However, constant spacing plus good transducer penetration can be achieved with such an arrangement. In fact, total penetration of stabilizer 10 into the record medium is less with this arrangement for a given transducer penetration than if the transducer resides below apex 14.

Figure 2:
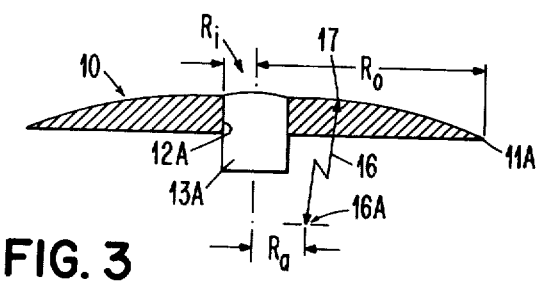
FIG. 2 is a diagrammatic cross-sectional view of the FIG. 1 illustrated stabilizer taken along a diameter and having a cross-section in accordance with a prior stabilizer which does not yield the advantage of the present invention.

The present invention provides performance improvements over a FIG. 1 type of stabilizer having a cross-section as shown in FIG. 2. In the FIG. 2 stabilizer, the transducer 13A is installed in the center of the toroid, with the inner surface 12A having a radius $R_i$ and the outer surface at a 11A with a radius $R_0$. The contour of the stabilizer has a radius of curvature indicated by arrow 16 from center 16A with an apex or outermost point at 17, with a radius $R_a$. This configuration has a circular apex line with a radius close to the center of the toroid. The toroid may have a web closing the usual center hole. Capacitance type measurements on the FIG. 2 illustrated stabilizer resulted in the surface profile diagram shown in FIG. 2A wherein the set of lines at 20 indicate a rigid backing plate (not shown) having a surface 6 of Lawrence et al, supra. The general vertical lines in area 21 represent the stabilizer assembly, while lines 22 represent the flexible disk relatively moving with respect to the stabilizer assembly. It should be noted that at 23 the flexible record disk 25 has a bubble shape, or a ballooning of the record disk 25 over transducer 13. This ballooning results in the medium being moved away from transducer 13, contrary to optimum medium-to-transducer relationships. That is, rather than ballooning at 23, the record medium should tend to move toward transducer 13 for ensuring a close spacing between medium and transducer for yielding reliable recording and reproduction. It has been found also in experiments that the spacing between the record medium and the transducer, when the ballooning as shown at 23 occurs, generally exhibits less stability than the spacing provided by practicing the present invention.

In accordance with the invention, the contour of a toroidal stabilizer has a stabilizing surface 14 with an apex radially positioned in accordance with the equation:

$$R_a - R_i \geq \tfrac{1}{2}(R_o - R_i) \qquad 1.$$

Figure 3:
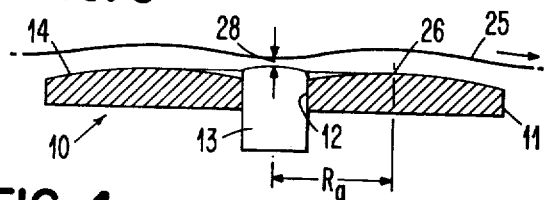
FIG. 3 is a diagrammatic cross-sectional view of a FIG. 1 stabilizer taken along a diameter but constructed in accordance with the teachings of the present invention.
Figure 4:
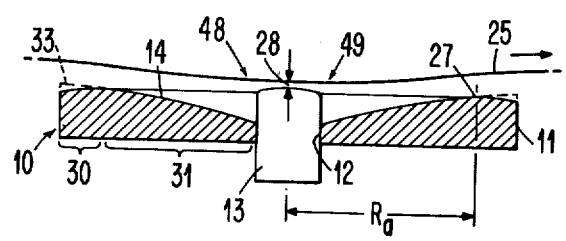
FIG. 4 is a showing similar to FIG. 3 but in a more preferred configuration in accordance with the teachings of the present invention.

Such a configuration is shown in FIGS. 3 and 4. In these latter figures, stabilizer 10 is shown adjacent a relatively moving magnetic record disk 25 moving in the direction of the arrow. The centrally located transducer 13 substantially closes the center hole of the torous blocking air flow. Such blockage assists in maintaining a relatively large negative pressure at the toroies center for urging record disk 25 toward transducer 13. When the center of stabilizer 10 is opened to ambient pressure, the effect of the negative pressure is degraded, i.e., air entering through the opening reduces the negative pressure toward zero. Therefore, such airflow is preferably either eliminated or restricted. Controlling the opening adds an additional control parameter.

In FIG. 3, the contoured medium-facing surface 14 has an apex at the radial point 26 while in FIG. 4, the apex of a surface 14 is at 27. FIG. 3 illustrates a radial inwardmost location of apex 26 which still provides a predictable, somewhat constant spacing 28 between medium 25 and centrally located transducer 13. In the FIG. 3 apparatus, spacing 28 varies somewhat, as will be later described, but is maintained relatively close to the transducer for effecting high quality transducing operations as opposed to the ballooning induced under certain circumstances by the FIG. 2 illustrated stabilizer. Later-described comparative tests show the FIG. 4 illustrated stabilizer provides a closure and more constant spacing than that of the FIG. 2 apparatus.

The FIG. 4 illustrated configuration has apex 27 of surface 14 closer to the radial outer surface 11 of the stabilizer than the inner radial surface 12. This configuration provides greater stabilization of the spacing 28 than the FIG. 3 illustrated configuration. It is believed that the reason for this is that the apex 27 of the stabilizing surface 14 is closer to the radial surface 11 than the inner radial surface 12. In this regard, as record medium 25 travels across the surface 14, a relatively positive pressure is induced between the record medium 25 and surface 14 at the outer radial portion 30. That is, record medium 25 traps air in area 30 tending to force record medium 25 away from stabilizer 10. On the other hand, as surface 14 extends downwardly from apex 27 to inner radial surface 12, as in area 31, a relatively negative pressure is induced between record medium 25 and surface 14 in area 31. Such low or negative pressure tends to move record medium 25 toward the stabilizer. As the size of area 31 increases with respect to area 30, the stabilizing force on record medium 25 urging it to move toward transducer 13 increases, resulting in a more positive control of the medium-to-transducer spacing.

Figure 2A:
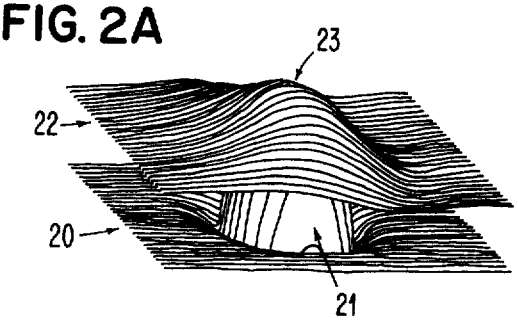
FIG. 2A is a surface profile diagram taken in measurements for determining the operation of the FIG. 2 illustrated stabilizer with respect to flexible record disks. The vertical ordinate is greatly magnified.
Figure 4A:
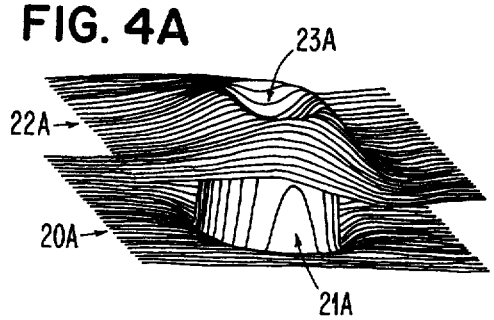
FIG. 4A is a showing similar to FIG. 2A but for the FIG. 4 illustrated cross-section.

The above action was verified in a set of comparative tests which included FIG. 4A measurement results for the FIG. 4 illustrated stabilizer. Lines 20A represent the surface of a backing plate (not shown) such as surface 6 of Lawrence et al, supra. Lines 21A represent the surface of a FIG. 4 illustrated stabilizer and lines 22A represent the surface of the flexible disk used in measurements resulting in the FIG. 2A illustration. In both FIGS. the vertical ordinate is about 33 times the horizontal ordinate. The resultant dimple at 23A results from negative pressure urging disk 22A toward the stabilizer 10. FIG. 4A shows the desired results from using the FIG. 4 illustrated embodiment. Suitably modifying the FIG. 4 illustrated embodiment results in altered dimpling, i.e., dimpling can be made asymmetrical, etc.

Such dimpling further enables a close spacing between record medium and transducer with low loading forces on the stabilizer, i.e., stabilizer 10 is usually pushed toward (loaded) the second disk. With the FIG. 4 construction, for a given spacing 28, the loading is less — resulting in less wear.

On design extreme of stabilizer 10 has the radius of apex 27 equal to the outer radius, as indicated by dotted lines 33 in FIG. 4. While the principles of the invention are employed in such a configuration, one can expect excessive wear of the medium 25 by rubbing over a sharp edge at the outer radius. Such wear would round the outer edge moving the apex radially inwardly. Accordingly, for reduced wear purposes, a configuration resembling the FIG. 4 illustrated cross-section is preferred. Because of reduced loading requirements, i.e., less force on stabilizer to obtain good transducer to medium spacing 28, in the FIG. 4 illustrated cross-section than in the FIG. 2 illustrated cross-section, less abrasion and wear is expected from using the FIG. 4 illustrated embodiment than by using the FIG. 2 illustrated construction.

Figure 5:
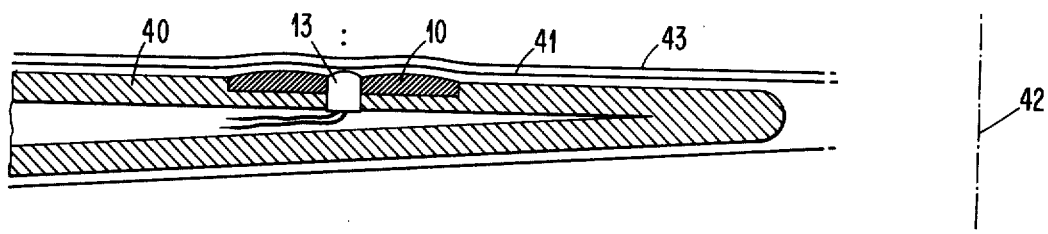
FIG. 5 is a diagrammatic showing of a stabilizer with transducer showing the relationship between the flexible record disk and the stabilizer and transducer in one embodiment.

Another factor of the contour effect on the storage apparatus is shown in FIG. 5 wherein a stabilizer 10 is mounted on flat plate 40. Plate 40 can either be a portion of a single disk or a multiple disk apparatus as described in the documents incorporated by reference. In any event, the record disk 41 rotating about an axis 42 has a surface facing stabilizer 10 for containing magnetic signals to be exchanged with apparatus (not shown) via transducer 13. The penetration of stabilizer 10 into the plane of disk 41 causes it to move upwardly as seen in that FIG. This movement has an effect on a backing disk 43 causing it also to move. In accordance with Griffiths et al, supra, air flowing radially outwardly from axis 42 between disk 41, 43 tend to keep the disks separated. However, with sizeable penetration, such as provided by a ballooning effect of disks 41, as shown in FIG. 2A, contact can be made between disks 41 and 43. Repeated contact may result in abrasion, even though the rubbing action between the disks is slight. Accordingly, the FIGS. 3 and 4 profiles, the penetration into the disk plane for effective transducing is less, causing a smaller displacement, thereby reducing any wear and debris generation by backing disks in a stack of flexible disks. An undesirable penetration is affected by so many parameters that dimensions are not given. Such parameters include disks axially spacing, flexibility, and the like.

Figure 6:
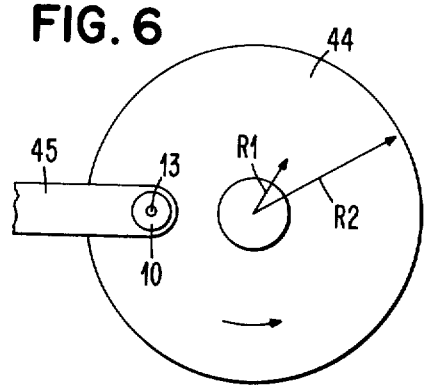
FIG. 6 is a diagrammatic plan view of the record storage apparatus employing the teaching of the present invention.

Another factor is the continued stability of a single record disk with respect to a supporting platform, particularly in a single disk recorder, as shown in Lawrence et al, supra. That is, as seen in FIG. 6, a single disk 44 is rotating about an axis to be transduced by transducer 13 contained on a support arm 45 with the stabilizer 10 surrounding the transducer 13. At an inner radius R1, the disk 44 is quite tolerant to penetration effects while maintaining stability or spacing from a rigid backing disk (not shown in FIG. 6) as taught in Lawrence et al. However, at the outer radius R2, penetration can have a severe debilitating effect on disk stabilization. Accordingly, the action of the stabilizer shown in FIGS. 3 and 4 tending to reduce disk penetration and induced forces in the record tends to reduce any disk destabilization effects. In this regard, it is preferred that the stabilizer 10 be moved above the plane of the rigid backing plate or disk or accessing tracks of varying radii.

A series of tests between the FIGS. 2 and 4 illustrated profiles was conducted on a single disk apparatus, such as shown by Lawrence et al. In such tests, the magnetic medium was about a 1.5 mil Mylar substrate magnetically coated record disk disposed over a rigid plate. A pair of stabilizers constructed respectively as shown in FIGS. 2 and 4 were used in some of the tests. These stabilizers had an outside radius of 9.5 millimeters, an inside radius of 2.6 millimeters, and a closed-off bottom head support, i.e., no air was allowed to flow through the center of the torus. The apex radii $R_a$ was respectively 4.4 millimeters and 7.8 millimeters. The radius of curvature of surface 14 was 51 millimeters with the center of radius as indicated respectively in FIGS. 2 and 4. Using the same record medium, the configurations shown in FIGS. 2A and 4A were observed respectively for the stabilizer profiles. At the center of the torus, the profile of the medium over the center of the FIG. 2 illustrated stabilizer was symmetrical; while over the FIG. 4 illustrated profile, there was a sharp dip with some assymetry with the medium being closer to the stabilizer at the leading side of the stabilizer. That is, as seen in FIG. 4, record medium 25 at point 48 was closer to the stabilizer 10 than at 49, the section 48 being a leading portion of the stabilizer and the portion at 49 being a trailing portion of the stabilizer. It was noticed in the comparative tests that the spacing between the medium and the transducer 13 was usually substantially lowered with the FIG. 4 illustrated profile with respect to the FIG. 2 illustrated profile. Further comparative tests were conducted on smaller diameter stabilizers with substantially similar results being attained.

The FIG. 4 illustrated profile stabilizer enabled constant head-to-medium spacing with the following described variations in operational parameters. The penetration into the medium 25 by the stabilizer and transducer 13 was varied by 0.3 millimeters with no measurable variation in medium-to-transducer spacing. Such tests show the apparatus of the invention appears to be able to accommodate a variety of temperature and humidity changes in an operating environment while maintaining constant head-to-medium spacing. The same spacing was achieved with transducer 13 adjusted axially of the stabilizer by 0.1 millimeter. Further, a half-scale stabilizer was constructed, i.e., half sizes of the first indicated test, with no measurable deviations from the above described behavior noted.

The FIG. 2 profile resulted in changed transducer-to-medium spacing at different disk radii. This spacing variation resulted from changes in disk tension (as outer radii tension is reduced), and speed (as outer radii speed is increased). Tests showed greater spacing at middle radii (ballooning as in FIG. 2A) and closer spacing at inner and outer radii. At the inner radii of disk 25, there was less ballooning (reduced speed and increased tension) while at outer radii of disk 25 there was some dimpling as shown in FIG. 4A (reduced tension — greater speed). On the other hand, the FIG. 4 profiled stabilizer resulted in a substantially constant spacing throughout identical tests parameters. This constant spacing will result in a more predictable recording apparatus operation, hence, more reliable operation and easier design.

The FIG. 4 illustrated profiled stabilizer exhibited a sensitivity to loading, i.e., penetration in the record storage disk 25. An increased loading tends to create higher disk tension resulting in a closer spacing 28 at outer peripheries of a single disk. Suitable measurements of a given apparatus will show the loading of a stabilizer for a maximal insensitively to speed and other parameter changes. Even without such measurements and heuristic optimization, the invention provides a enhanced recorder operation.

My conclusions resulting from the above mentioned comparative tests, the performance of the FIGS. 3 and 4 illustrated profiles of the present invention provide an order of magnitude improvement for enhanced recording and signal reproduction with respect to a circular record disk than that provided by the FIG. 2 illustrated profile. In the above mentioned tests, the profile of surface 14 had a single radius; it is to be understood that compound radii may be used so long as the broad principles of the present invention are followed as hereinbefore set forth. Also, the plan shape, shown as circular, can be changed to ovate, rectangular as well as having perturbations in the shape to achieve particular desired results. The term toroid is intended to include a solid disk with a toroidal convex stabilizing surface with apex 14.

While the invention has been particularly shown and described with reference to a preferred embodiment thereof, it will be understood by those skilled in the art that various changes in form and detail may be made therein without departing from the spirit and scope of the invention.

What is claimed is:

1. A combination head support and flexible medium stabilizer comprizing a toroidal member with a radial inner surface portion and an outer surface portion coaxial to the axial axis of said toroid and having a circular convex-shaped medium-facing surface portion with an annular apex being an outwardmost line of said convex surface located not less than one-half of the difference between the radii of said outer and inner surfaces; and
   means disposed at said inner radial portion and extending thereacross for substantially blocking air flow along said axial axis.

2. The apparatus set forth in claim 1 wherein the apex is radially closer to said outer portion than said inner portion.

3. The apparatus set forth in claim 1 wherein said convex surface has a given radius of curvature centered on a line extending parallel to said central axis and through said apex.

4. The apparatus set forth in claim 1 further including transducer means disposed at said radial inner portion and having a record sensing portion extending outwardly along said central axis from said medium facing surface adjacent said inner radial surface.

5. The apparatus set forth in claim 4 wherein said transducer means extends outwardly a distance greater than said apex.

6. The apparatus set forth in claim 5 wherein said transducer means has an air bearing surface extending axially beyond said apex.

7. Flexible disk-to-transducer stabilizing apparatus,
   a plate member facing said disk to be stabilized with respect to a transducer;
   means for relatively rotating said flexible disk about a first axis with respect to said plate along a first direction;
   a transducer disposed on said plate and extending toward said flexible disk for exchanging signals therewith;
   the improvement including in combination:
   a leading stabilizing member having a leading and trailing portion and extending from said plate toward flexible disk and having a convex surface extending between said leading and trailing portion and facing said flexible disk with a given radius of curvature including a center closer to said leading portion than said trailing portion;
   means in said plate adjacent said leading stabilizing member for preventing axial air flow from said plate to said disk past said transducer; and
   said trailing portion being juxtaposed to said transducer whereby said flexible disk moves over said leading stabilizing member, then over said transducer whereby a negative pressure adjacent said transducer is induced by said disk rotating so that said disk is urged into a transducing relation with said transducer.

8. The apparatus set forth in claim 7 further including a trailing stabilizing member on said plate member extending toward said flexible disk having a leading portion in juxtaposition to said transducer and a trailing portion disposed from said leading portion in said one direction; and
   said trailing stabilizing member having a convex surface extending between said portions of said trailing member with a given radius of curvature with a center closer to said trailing portion than said leading portion of said trailing member whereby said negative pressure is enhanced.

9. The apparatus set forth in claim 7 further including stabilizing means joining said member to said transducer on said plate member.

10. The apparatus set forth in claim 8 further including said transducer having an air bearing surface facing said flexible disk and extending thereto closer than said convex surface.

11. Apparatus set forth in claim 7 further including a stabilizing member joined to said leading stabilizing and circumscribing said transducer on said plate such that an air bearing circumscribes in a given spaced relation to said transducer creating a cavity intermediate said transducer and said members for maximizing said negative pressure as said flexible disk covers and moves over said cavity.

12. A combination transducer support and flexible record member shaper and stabilizer,
   including in combination:
   a plate member facing said flexible record member for stabilizing said flexible record member during relative movements of said member in a first direction,
   a transducer on said plate and facing said flexible record member for exchanging signals with said flexible record member;
   a flexible record member conformance inducing portion of said plate member encircling said transducer; and
   said inducing portion having a convexly curved surface portion facing said flexible record member including inner and outer surface portions respectively juxtaposed to said transducer and displaced from said transducer a predetermined spacing with a line apex of convex curvature closer to said outer portion than said inner portion.

* * * * *